United States Patent
Perez-Feliciano et al.

(10) Patent No.: US 11,102,388 B2
(45) Date of Patent: Aug. 24, 2021

(54) SELF PORTRAIT IMAGE PREVIEW AND CAPTURE TECHNIQUES

(71) Applicant: Lenovo (Singapore) Pte. Ltd., Singapore (SG)

(72) Inventors: David Perez-Feliciano, Morrisville, NC (US); Justin Michael Ringuette, Morrisville, NC (US); Catherine Pratt Davis, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 576 days.

(21) Appl. No.: 14/539,409

(22) Filed: Nov. 12, 2014

(65) Prior Publication Data
US 2016/0134797 A1  May 12, 2016

(51) Int. Cl.
*H04N 5/225* (2006.01)
*H04N 5/232* (2006.01)
*H04N 5/262* (2006.01)

(52) U.S. Cl.
CPC ....... *H04N 5/2258* (2013.01); *H04N 5/23293* (2013.01); *H04N 5/2621* (2013.01)

(58) Field of Classification Search
CPC ............. H04N 5/2258; H04N 5/02393; H04N 5/2621; H04N 5/23293; H04N 5/23219; H04N 5/23232; H04N 5/232935; H04N 5/272; H04N 5/247; H04N 2007/145
USPC ......... 348/252, 239, 333.12, 333.01, 333.02, 348/333.05, 586, 597, 625, 14.03, 14.07, 348/47, 52; 382/118, 189, 190, 117, 115, 382/266, 269, 199, 274; 345/173, 640; 455/575.1, 571.1
See application file for complete search history.

(56) References Cited

U.S. PATENT DOCUMENTS

| | | | | |
|---|---|---|---|---|
| 8,866,943 B2* | 10/2014 | Park et al. | ......... | H04N 5/23222 348/218.1 |
| 2005/0036044 A1* | 2/2005 | Funakura | ........... | G06K 9/00228 348/239 |
| 2006/0044396 A1* | 3/2006 | Miyashita | ............ | H04N 5/2252 348/207.99 |
| 2012/0120186 A1* | 5/2012 | Diaz | .................... | H04N 5/2258 348/36 |
| 2012/0268641 A1* | 10/2012 | Kazama | ................. | H04N 5/262 348/333.11 |
| 2012/0274808 A1* | 11/2012 | Chong | ................. | H04N 5/2258 348/234 |
| 2013/0235224 A1* | 9/2013 | Park | ................... | H04N 5/23222 348/218.1 |

(Continued)

FOREIGN PATENT DOCUMENTS

| | | |
|---|---|---|
| EP | 1507386 A1 | 2/2005 |
| EP | 1560421 A1 | 8/2005 |
| EP | 2441504 A2 | 4/2012 |

*Primary Examiner* — Marly S Camargo
*Assistant Examiner* — Marly Camargo
(74) *Attorney, Agent, or Firm* — Ference & Associates LLC

(57) ABSTRACT

One embodiment provides a method, including: activating, on a device, a world view camera; obtaining, using the world view camera, world view image data; activating, on the device, a front view camera; obtaining, using the front view camera, front view image data; and providing, on a display of the device, a view displaying the front view image data and the world view image data. Other aspects are described and claimed.

17 Claims, 2 Drawing Sheets

(56) References Cited

U.S. PATENT DOCUMENTS

| | | | |
|---|---|---|---|
| 2014/0195914 A1* | 7/2014 | Gillard | H04N 13/004 715/719 |
| 2014/0240540 A1* | 8/2014 | Kim | H04N 5/2258 348/231.99 |
| 2015/0237268 A1* | 8/2015 | Vaiaoga | H04N 5/247 348/218.1 |
| 2016/0057363 A1* | 2/2016 | Posa | H04N 5/272 348/239 |

* cited by examiner

SELF PORTRAIT IMAGE PREVIEW AND CAPTURE TECHNIQUES

BACKGROUND

Electronic devices such as mobile phones, tablets and other such portable devices often include cameras. Increasingly such devices are equipped with more than one camera. A common combination is to provide a world view or main camera (often of high quality, e.g., high resolution) that captures image data from the back of the device (e.g., opposite to the touch screen display on a tablet or mobile phone/smart phone) and a front view camera (often but not necessarily of lower quality, e.g., lower resolution than the main camera) that captures image data on the other side of the device (e.g., on the side of the device containing the touch screen display).

Users frequently carry their smart phones or other portable/mobile devices with them and because of this, often use the cameras for picture taking A popular type of picture is a self portrait, colloquially known as a selfie, as it often includes the user of the device and some interesting background (e.g., view of an interesting landscape, other person(s) such as a celebrity, etc.). While many techniques may be employed for taking a selfie, a common technique is to use the front view camera, i.e., the lower quality camera on the device. Otherwise, a user needs to turn the device around physically to aim the main camera at himself or herself for the self portrait.

BRIEF SUMMARY

In summary, one embodiment provides a method, comprising: activating, on a device, a world view camera; obtaining, using the world view camera, world view image data; activating, on the device, a front view camera; obtaining, using the front view camera, front view image data; and providing, on a display of the device, a view displaying the front view image data and the world view image data.

Another aspect provides a device, comprising: a front view camera; a world view camera; a display device; a processor; and a memory device that stores instructions executable by the processor to: activate the world view camera; obtain, using the world view camera, world view image data; activate the front view camera; obtain, using the front view camera, front view image data; and provide, on a display of the device, a view displaying the front view image data and the world view image data.

A further aspect provides a product, comprising: a storage device having code stored therewith, the code being executable by a processor and comprising: code that activates, on a device, a world view camera; code that obtains, using the world view camera, world view image data; code that activates, on the device, a front view camera; code that obtains, using the front view camera, front view image data; and code that provides, on a display of the device, a view displaying the front view image data and the world view image data.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
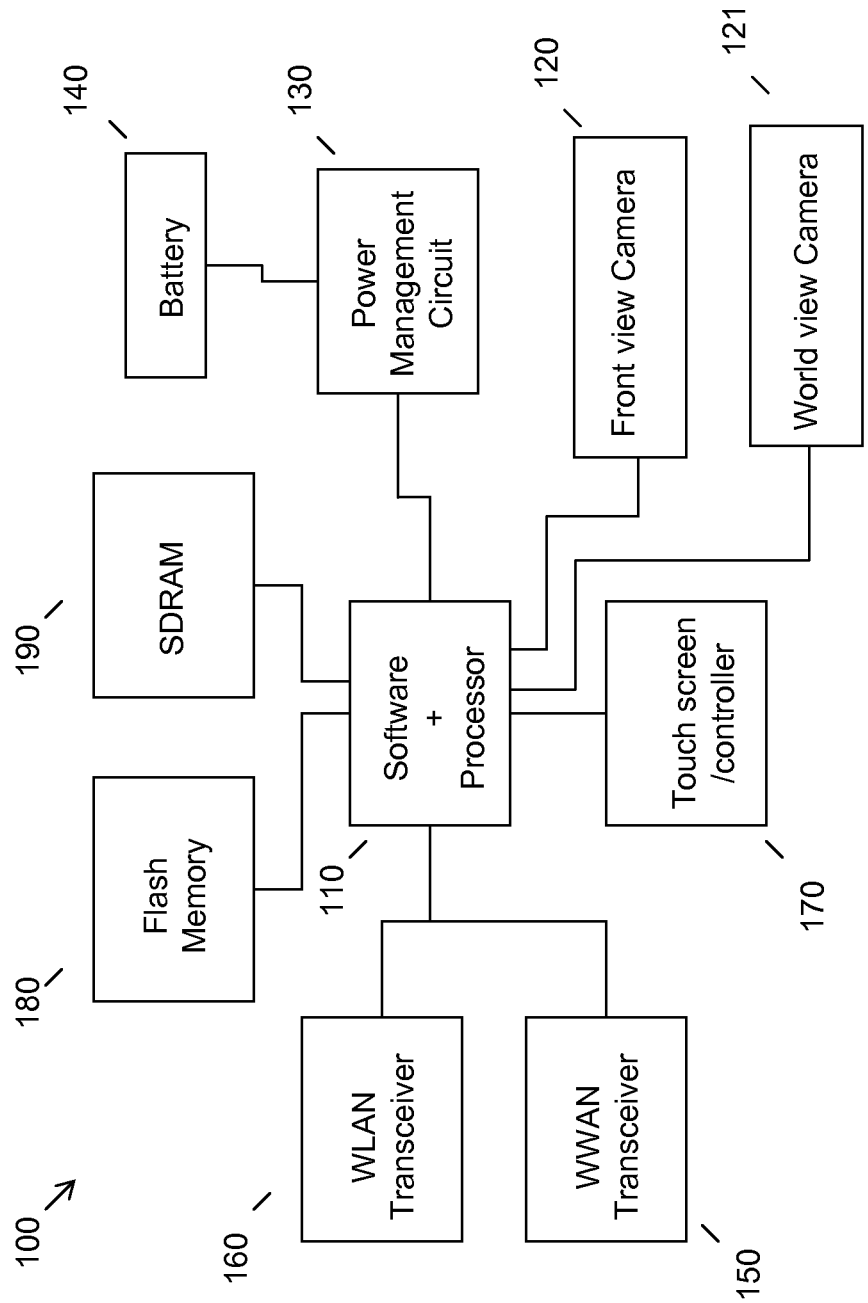
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

There are at least two technical problems with current mobile camera technology that need to be addressed with respect to the self portrait (selfie), where this term includes group photos in some contexts, as further described herein. A first technical problem is that, when taking a self portrait style photo, the user often employs the low quality camera out of convenience and thus ends up with lower quality pictures. This is due to the mobile device's physical layout, i.e., the front view camera and the touch screen display offering the picture preview are located on the same side of the device. To obtain a higher quality image using the main or world view camera, the user is forced to physically rotate the phone, tablet, etc., around such that his or her hand is craned. Naturally no preview is possible.

At this point it is worth noting that although the term "background" is used to describe the image data captured by a world view camera as opposed to image data captured by another camera (e.g., that captures the foreground user(s)), this background image data may include another person, object(s), or group of people in the background (i.e., the world view camera captures world view image data). Thus the term "background" as used herein simply indicates image data that is captured by one camera (e.g., a world view camera) as opposed to image data captured by another camera (e.g., a front view camera capturing front view image data), which may include the user(s) or other object(s) of interest in the "foreground."

A second technical problem is that, even if the high quality/world view camera were facing the same direction, the user is left with no choice but to physically orient themselves to be in front of or otherwise included with the view of background material of interest. That is to say if a user wants a selfie with another person, the user must stand beside of or in front of that other person. Likewise, if a user wants to have an interesting feature or landscape included in the selfie, the user must position himself or herself such that the image includes the user and the interesting feature or landscape. This has led to awkward or dangerous situations where users attempt to physically locate themselves where they pose a risk or disturbance to themselves or others.

Accordingly, an embodiment provides a user with the ability to take a self portrait image that includes a foreground user or object and any background material of interest (again, including other(s) or inanimate feature(s)) without needing to rely on low quality cameras alone and without physically repositioning user(s), object(s) or other(s) into awkward or dangerous positions.

An embodiment provides that both a front view and a world view camera may be utilized together such that the user can remain on the opposite side of the device relative to the object of their affection (celebrity, interesting landscape, dangerous animal, etc.). An embodiment permits the user to select foreground image data using one camera and include it with, e.g., overlay it on, background image data gathered using another camera. In an embodiment, a real-time preview is provided to the user having both the foreground image data and the background image data. In an embodiment, a user may manipulate or adjust the foreground data, the background data, or both, in real-time using the preview. The manipulation or adjustment may include, by way of example, adjustment or changing of settings such as contrast, brightness, hue, etc., may include manipulation or adjustment of foreground or background image data, e.g., changing of the size of the image data, its relative positioning, etc.

An embodiment may likewise make suggestions, e.g., communicated through the preview, based on various determinations. For example, an embodiment may apprise the user of an appropriate camera given the lighting or other conditions for use in the picture, etc. Likewise, an embodiment may suggest changes or automatically adjust foreground and/or background image data in both terms of settings (contrast, brightness, hue, etc.) and image manipulation (size, positioning, cropping, etc.).

In an embodiment, a front view camera may capture image data of the user taking the selfie while also capturing image data of the background using the world view camera. Then, an embodiment may use image recognition techniques, e.g., facial recognition, edge finding, etc., to crop the background from the front view camera image data, i.e., crop the image of the user out. This image data of the user is then placed by an embodiment in a preview with the background image data from the world view camera. The preview may be provided for user review, manipulation and approval, e.g., displayed on a touch screen.

For example, an embodiment may overlay the cropped image of the user onto the background image data in the preview. This permits the user to have real time feedback and preview capabilities regarding the composite image. Thus, a user may adjust or otherwise make real time changes to the combined or composite image to his or her liking before taking the picture and saving it to storage.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C. However, some types of devices may use solid state drives and SATA interfaces.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices are commonly included, e.g., devices that are used to provide input, provide output, provide additional storage, and the like.

System 100 includes a front view camera 120 and a world view camera 121, each of which may provide image data for picture taking and use in a preview, for example as displayed on touch screen 170. Touch screen 170 may be used for data input and display/rendering, as further described herein. System 100 also typically includes various memory devices, for example flash memory 180 and SDRAM 190. As is apparent from the description herein, devices may include other features or only some of the features of the example illustrated in FIG. 1.

Figure 2:
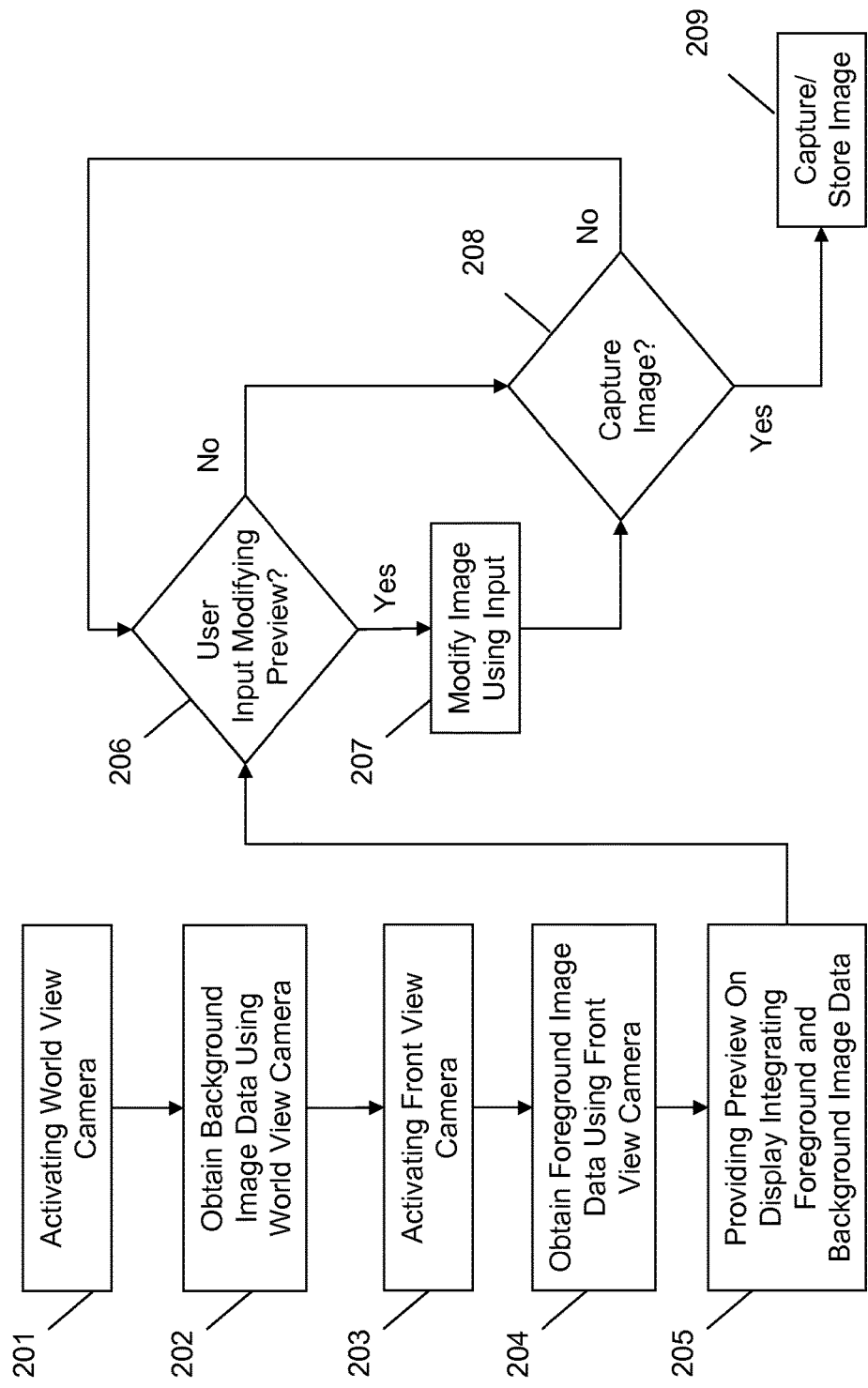
FIG. 2 illustrates an example method of self portrait image preview and capture.

Device circuitry, as for example outlined in FIG. 1, may be used in a smart phone or tablet (or like device) with which a user takes selfies. For example, FIG. 2 illustrates an example method of providing a preview and capturing a self portrait according to an embodiment.

In an embodiment, a user may activate a world view camera at 201 and thus the device may obtain, using the world view camera, background image data at 202. Likewise, and in no particular ordering, a user may activate the front view camera at 203 and thus the device may obtain, using the front view camera, foreground image data at 204.

It will be appreciated by those having skill in the art that the ordering of the front view and rear view camera activation and image data obtaining steps may be reversed from those illustrated, and moreover may be conducted simultaneously. For example, both cameras 120, 121 may be activated at the same time, e.g., responsive to a user opening a camera application on the system 100 and/or opening a selfie mode in the camera application. Moreover, the background image data may be obtained by the front view camera 120, whereas the foreground image may be obtained by the word view camera 121.

Having both the background image data from the world view camera 121 and the foreground image data from the front view camera 120, an embodiment may provide, e.g., on touch screen 170, a preview integrating the foreground image data and the background image data. In one form, this may be accomplished by processing the foreground image data to crop out user(s) from the image data and place this data as an overlay image with respect to the background image data. The preview in at least one embodiment is a composite image stream having image data from both the front view camera and the world view camera. It will be appreciated then that in this description, while images such as pictures are referenced as examples, the various embodiments may be used to capture and store video data.

The identification of objects in the foreground image data and/or the background image data, for its part, may include for example identifying one or more foreground objects in the foreground image data using facial identification and/or edge detection techniques. This permits the isolation of foreground data objects, e.g., a user, and utilization of the image data, e.g., in an overlay or integration with the background image data.

A preview may be provided at 205 such that a user has real-time feedback with respect to the image data combination. Thus, the user might review the image in real-time and provide user input to modify the preview. The user input may be image settings input and/or image manipulation input. The settings input may be image-wide settings input or settings input applied to only a portion of the image (i.e., foreground or background). The settings may include, by way of example, contrast settings input, brightness settings input, and hue setting input.

The image manipulation input may include input moving one or more foreground objects relative to the background image data in the preview and/or resizing of the foreground and/or background image data. Moreover, the image manipulation input may include input from a user indicating that more, less, or different foreground image data and/or background image data should be captured for use in the preview. Thus, for example, an embodiment may provide (e.g., display) guidelines that outline the cropped foreground image within the background image such that a user may move the guidelines within the preview to select more or less foreground image data and/or background image data for use in the preview and ultimately the captured/stored image.

An embodiment therefore determines if the user has provided any such modifying input at 206 and, if so, applies the modifications to the image at 207. Although not explicitly illustrated in FIG. 2, this may update the preview, as the preview is in one example a real-time feed of the image data currently used to form the combined or composite image.

In certain circumstances, more than one foreground object (e.g., user) may be detected, as may more than one background object. For example, in a group photo, an embodiment may capture with the world view camera a first group of people, considered as background image data. An embodiment may capture a second group of people with the front view camera, considered as foreground image data. Thus, an embodiment may be used to position the people identified in the foreground image data as an overlay onto the background image data. An embodiment may provide automatic adjustments, e.g., automatically offsetting one or more of the foreground objects and the background objects from one another within the preview, as if both sets of people appeared in the same camera view, similar to the single user selfie scenario.

Once a user is satisfied that the preview is as it should be, i.e., no more (if any) modifications are forthcoming, an embodiment may determine that the image is to be captured at 208. As may be appreciated, this determination at 208 may include detecting a positive input, e.g., user touching a shutter icon in the touch screen, or may be done automatically, e.g., after a predetermined time. The image may then be captured and stored at 209.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   activating, on a device, a world view camera;
   obtaining, using the world view camera, world view image data;
   activating, on the device, a front view camera;
   obtaining, using the front view camera, front view image data;
   providing, on a display of the device, a view displaying a combined preview of the front view image data and the world view image data, wherein the combined preview is provided prior to capturing and storing the combined image;
   identifying one or more foreground objects in the front view image data; and
   identifying one or more background objects in the world view image data;
   wherein the providing comprises automatically offsetting, during provision of the preview and without user adjustment, the one or more foreground objects and the one or more background objects from one another, wherein the automatically offsetting comprises dynamically positioning the one or more foreground objects in relation to the one or more background objects based upon a predetermined rule set.

2. The method of claim 1, further comprising storing image data comprising both the front view image data and the world view image data.

3. The method of claim 1, wherein the providing comprises identifying one or more foreground objects in the front view image data.

4. The method of claim 3, wherein the identifying comprises one or more of facial identification and edge detection.

5. The method of claim 1, further comprising receiving user input to change the combined preview.

6. The method of claim 5, wherein the user input is selected from the group consisting of contrast settings input, brightness settings input, and color correction input.

7. The method of claim 5, wherein the user input is image manipulation input moving one or more foreground objects relative to the world view image data in the combined preview.

8. The method of claim 7, wherein the image manipulation input comprises touch screen input.

9. A device, comprising:
   a front view camera;
   a world view camera;
   a display device;
   a processor; and
   a memory device that stores instructions executable by the processor to:
   activate the world view camera;
   obtain, using the world view camera, world view image data;
   activate the front view camera;
   obtain, using the front view camera, front view image data;
   provide, on a display of the device, a view displaying a combined preview of the front view image data and the world view image data, wherein the combined preview is provided prior to capturing and storing the combined image;
   identify one or more foreground objects in the front view image data; and
   identify one or more background objects in the world view image data;
   wherein to provide a view displaying the front view image data and the world view image data comprises automatically offsetting, during provision of the combined preview and without user adjustment, the one or more foreground objects and the one or more background objects from one another, wherein the automatically offsetting comprises dynamically positioning the one or more foreground objects in relation to the one or more background objects based upon a predetermined rule set.

10. The device of claim 9, wherein the instructions are further executable by the processor to store image data comprising both the front view image data and the world view image data.

11. The device of claim 9, wherein to provide the combined preview comprises identifying one or more foreground objects in the front view image data.

12. The device of claim 11, wherein the identifying comprises one or more of facial identification and edge detection.

13. The device of claim 9, wherein the instructions are further executable by the processor to process user input to change the combined preview.

14. The device of claim 13, wherein the user input is selected from the group consisting of contrast settings input, brightness settings input, and color correction input.

15. The device of claim 13, wherein the user input is image manipulation input moving one or more foreground objects relative to the world view image data in the view.

16. The device of claim 14, wherein the image manipulation input comprises touch screen input.

17. A product, comprising:
   a non-transitory storage device having code stored therewith, the code being executable by a processor and comprising:
   code that activates, on a device, a world view camera;
   code that obtains, using the world view camera, world view image data;
   code that activates, on the device, a front view camera;
   code that obtains, using the front view camera, front view image data;
   code that provides, on a display of the device, a view displaying a combined preview of the front view image data and the world view image data, wherein the combined preview is provided prior to capturing and storing the combined image;
   code that identifies one or more foreground objects in the front view image data; and code that identifies one or more background objects in the world view image data;

wherein the code that provides comprises code that automatically offsets, during provision of the preview and without user adjustment, the one or more foreground objects and the one or more background objects from one another, wherein the automatically offsetting comprises dynamically positioning the one or more foreground objects in relation to the one or more background objects based upon a predetermined rule set.

\* \* \* \* \*